United States Patent [19]
Faris

[11] Patent Number: 6,146,049
[45] Date of Patent: Nov. 14, 2000

[54] CONNECTOR FOR FLEXIBLE CABLE

[76] Inventor: F. Dale Faris, P.O. Box 2334, Harbor, Oreg. 97415

[21] Appl. No.: 09/332,016

[22] Filed: Jun. 14, 1999

[51] Int. Cl.[7] ..................................................... F16B 2/20
[52] U.S. Cl. ........................... 403/326; 403/375; 24/664; 70/457
[58] Field of Search ..................................... 403/326, 327, 403/328, 365, 366, 372, 375; 70/457; 24/664, 672, 662, 265 EC; 63/3, 3.1

[56] References Cited

U.S. PATENT DOCUMENTS

| 1,442,223 | 1/1923 | Knebusch | 403/326 |
| 2,476,617 | 7/1949 | Mueller | 403/375 X |
| 2,771,768 | 11/1956 | Todor | 63/3 X |
| 3,655,226 | 4/1972 | Cowan | 403/375 X |
| 4,706,367 | 11/1987 | Garringer | 403/365 X |
| 4,986,457 | 1/1991 | Faris | 223/1 |
| 5,037,233 | 8/1991 | Nishihara et al. | 403/326 X |
| 5,080,521 | 1/1992 | Quaile | 403/326 |
| 5,138,855 | 8/1992 | Faris | 70/457 |
| 5,509,750 | 4/1996 | Boike | 403/327 X |
| 5,716,160 | 2/1998 | Lee | 403/365 |
| 5,782,107 | 7/1998 | Glanz | 63/3.1 X |

*Primary Examiner*—Harry C. Kim
*Attorney, Agent, or Firm*—Mallinckrodt & Mallinckrodt; Brian R. Rayve; Robert R. Mallinckrodt

[57] ABSTRACT

Flexible loop assemblies for use variously as key chains, paper ring binders, or as jewelry and a connector for use in such loop assemblies. The connector includes elongate cylindrical mating male and female connector halves each having respective end bores into which opposite ends of a flexible member of monofilament or multi-filament metal or plastic are secured. The male connector half includes a generally cylindrical front plug with a radially-inwardly compressible lock ring of slightly larger uncompressed outer diameter than that of the plug. The plug closely fits into a mating cylindrical socket bore in the female connector half which radially compresses the lock ring during insertion of the plug therein. An annular lock ring groove inside the socket bore is configured to receive the outer portion of the lock ring which lock ring radially expands therein to removably retain the male and female connector halves together.

31 Claims, 3 Drawing Sheets

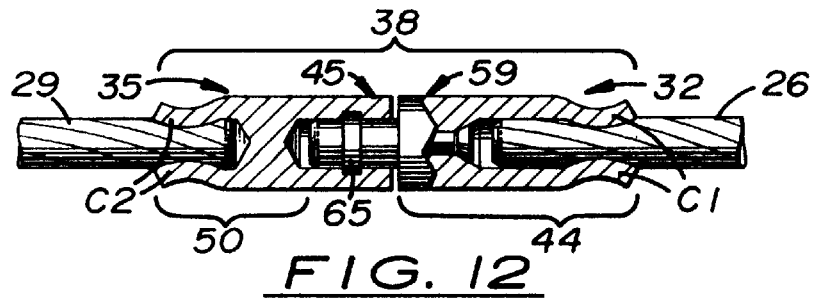
FIG. 12
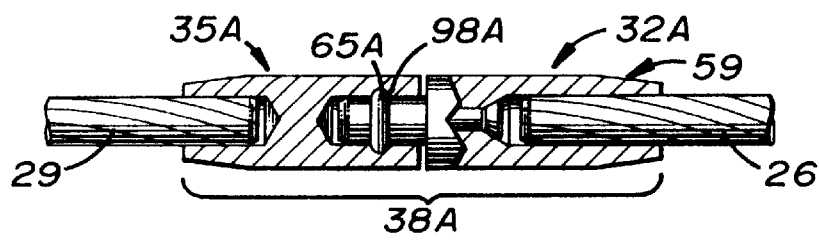
FIG. 13
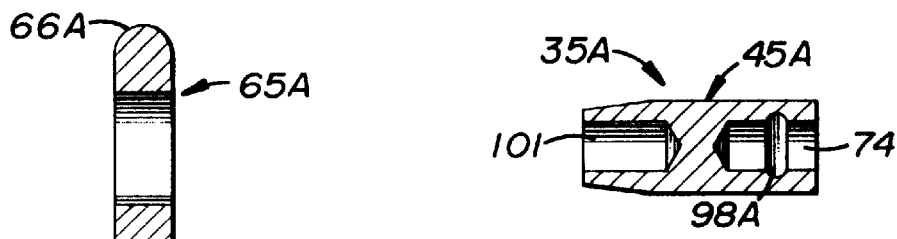
FIG. 14
FIG. 15
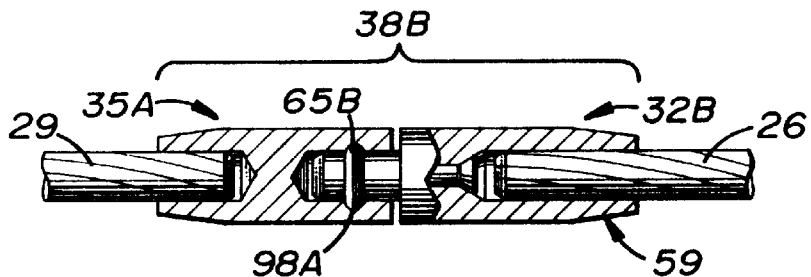
FIG. 16
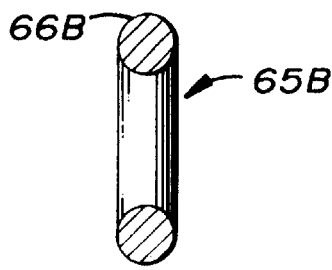
FIG. 17
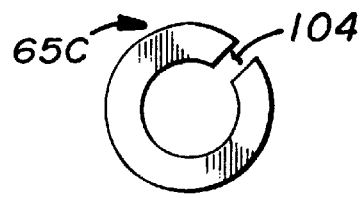
FIG. 18

CONNECTOR FOR FLEXIBLE CABLE

BACKGROUND OF THE INVENTION

1. Field

The invention is in the field of connectors for removably attaching together the ends of a flexible member, more specifically for use on key chains, jewelry, and for binding loose sheets of paper together.

2. State of the Art

Devices which utilize a length of cable the opposite ends of which connect together by means of ferrules or other such connectors have been used for many years. Such devices include key chains having a length of flexible cable with mating ferrules at opposite ends thereof which can be disconnected to add or subtract keys as well as reconnected for use. Multiple of such devices with the appropriate length of cable can be used to bind together loose leaf pages. Other such devices have ferrules which are permanently connected together.

An example of a device which has ferrules which permanently connect together is found in U.S. Pat. No. 4,986,457 issued to this inventor. The patent discloses a closed loop cable system primarily designed for preventing the theft of coats on display at retail stores by preventing a person from wearing the coat to subsequently walk out of the store wearing the coat. The system comprises a length of cable which is passed through at least one sleeve of the coat to form a loop. Opposite ends of the cable are provided with mating ferrules crimped thereto which ferrules are subsequently connected and crimped together using a special crimping tool. Upon sale of the coat the special tool has a cutter to cut the cable prior to departure of the customer with the coat. Such system does not allow multiple connection and disconnection cycles due to the crimping, such as needed for key chains, jewelry, and binder rings.

An example of a system which utilizes ferrules which are reconnectable is found in U.S. Pat. No. 5,138,855 also issued to this inventor. The patent discloses a flexible cable having a first ferrule crimped to one end thereof which includes an elongate, bullet shaped plug having a reduced diameter portion. A second ferrule crimped to the opposite end of the cable comprises a pair of tubular members, one having an inwardly disposed lip defining a socket and the other tubular member fitting inside the first tubular member with the end thereof spaced from the lip with a retaining ring disposed therein. When the plug is forced into the socket, the bullet shape thereof expands the retaining ring until the reduced diameter portion of the plug reaches the retaining ring wherein the retaining ring can contract to hold the plug in the socket.

Various connectors are used on jewelry such as necklaces and bracelets. Such connectors typically comprise a pair of loops, one closeable and one not, affixed to opposite ends of a braided or twisted chain. The closeable loop comprises an inner solid cross-section C-shaped member with a tab affixed at an end thereof and an outer tubular cross-section C-shaped member inside of which the inner member slides. The members are biased by a small spring within the outer C-shaped member to a closed position wherein the two members form a closed loop. When the tab is pressed, the C-shaped members slide relative to one another to a position wherein the openings thereof align to allow the other closed loop to fit therein and be retained thereby upon release of the tab.

SUMMARY OF THE INVENTION

The invention comprises connectors and flexible assemblies which utilize such connectors to removably connect together opposite end portions of a single flexible member to form a closeable loop, or to connect end portions of two flexible members together. The connector comprises a pair of elongate male and female connector halves each having respective attachment means for securing an end portion of a flexible member, such as a bore for insertion and affixing of such end portion therein, or a stud or a loop for wrapping such end portion around or otherwise affixing thereto. Such flexible members include single filament solid cable, multi-filament cable, and chain members. The male connector half includes a generally cylindrical front plug having a reduced diameter portion around which is disposed a radially-compressible lock ring of slightly larger uncompressed outer diameter than the outer diameter of the plug. The plug closely fits into a mating cylindrical socket bore in the female connector half in which the lock ring is radially-inwardly compressed during insertion of the plug thereinto. An annular lock ring groove inside the socket bore is configured to receive the outer portion of the lock ring, which lock ring radially expands therein to removably retain the male and female connector halves together.

A first embodiment connector includes a first version male connector having a first version lock ring of generally rectangular or square cross-section, and a first version female connector having a lock groove of mating generally squared-off or rectangular cross-section. A second embodiment connector includes a second version male connector having a second version lock ring similar to the first version lock ring but of generally rounded cross-section at the outer portion thereof, and a second version female connector having a lock groove of mating generally rounded cross-section. A third embodiment connector uses a third version male connector having a third version lock ring of generally completely rounded cross-section, and the second version female connector having the lock groove of mating generally rounded cross-section.

THE DRAWINGS

The best mode presently contemplated for carrying out the invention is illustrated in the accompanying drawings, in which:

FIG. 1 is a side elevational view of a typical loop assembly of the invention using the connectors of the invention, the loop being shown in an open position with mating male and female members of the respective connector halves attached at opposite ends of a flexible member;

FIG. 2, a side elevational view of such typical cable loop assembly with the male and female members of the respective connector halves removably connected together;

FIG. 3, a perspective view to a reduced scale of such typical loop assembly with a key attached thereto so as to function as a key chain;

FIG. 4, a perspective view to a reduced scale of a plurality of such typical loop assemblies with loose sheets of paper attached thereto so as to function as paper binder rings;

FIG. 5, an exploded fragmentary perspective view to an enlarged scale of a first embodiment connector of the invention which comprises a first version male connector half and a first version female connector half, such view also showing adjoining end portions of a flexible member;

FIG. 6, a longitudinal vertical sectional view taken on the line 6—6 of FIG. 5 showing the internal construction of a first version male member of such first version male connector half;

FIG. 7, a longitudinal vertical sectional view to an enlarged scale taken on the line 7—7 of FIG. 5 showing the construction of the insert pin used in all of the embodiments of the connector;

FIG. 8, a longitudinal vertical sectional view to an enlarged scale taken on the line 8—8 of FIG. 5 showing a first version lock ring which has a generally squared-off or rectangular cross-section of such first version male connector half;

FIG. 9, a longitudinal vertical sectional view of such first version male connector half assembled together with the end of the insert pin flared so as to hold the connector half together;

FIG. 10, a longitudinal vertical sectional view taken on the line 10—10 of FIG. 5 showing the internal construction of the first version female member of such first version female connector half;

FIG. 11, a fragmentary partial longitudinal vertical sectional view of such first embodiment connector with the first version male and female connector halves connected together and the respective cable end portions soldered or adhesively affixed thereto;

FIG. 12, a fragmentary partial longitudinal vertical sectional view corresponding to FIG. 11, but wherein the respective cable end portions are crimped thereto;

FIG. 13, a fragmentary partial longitudinal vertical sectional view of a second embodiment connector having second version male and female connector halves, which male connector half includes a second version lock ring having an outer portion of generally rounded cross-section;

FIG. 14, a longitudinal vertical sectional view to an enlarged scale of such second version lock ring;

FIG. 15, a longitudinal vertical sectional view showing the internal construction of such second version female member of the second version female connector half;

FIG. 16, a fragmentary partial longitudinal vertical sectional view of a third embodiment connector having a third version male connector half and the second version female connector half, which male connector half includes a third version lock ring of generally completely rounded cross-section;

FIG. 17, a longitudinal vertical sectional view to an enlarged scale of such third version lock ring;

FIG. 18, a side elevational view of an alternative version lock ring having a longitudinal split to allow radially-inward compression thereof.

DETAILED DESCRIPTION OF THE ILLUSTRATED EMBODIMENTS

Figure 1:
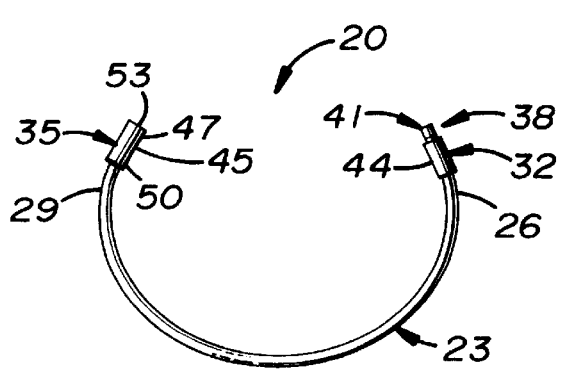
Figure 2:
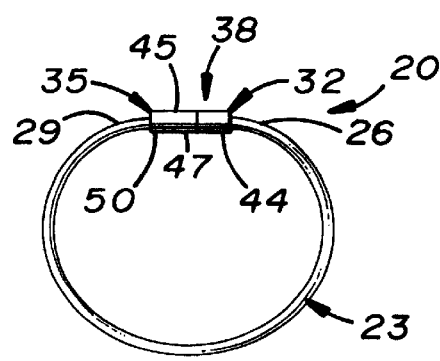

Referring to FIGS. 1 and 2, therein is shown a typical flexible loop assembly of the invention which utilizes the connectors of the invention. Loop assembly 20 comprises an elongate, flexible member, cable 23, having opposite end portions 26 and 29 to which respective first version male and female connector halves 32 and 35 of a first embodiment connector 38 are affixed. Male connector half 32 includes a front plug 41 and a rear attachment portion 44 which connects to cable end portion 26. Female connector half 35 comprises an elongate, generally cylindrical first version female connector member 45 having a front socket portion 47 and a rear attachment portion 50 which connects to cable end portion 29. Front plug 41 fits within a socket bore 53 of front socket portion 47, requiring relatively light finger pressure to connect male and female connector halves 32 and 35 yet locking together securely to prevent inadvertent separation thereof.

Figure 3:
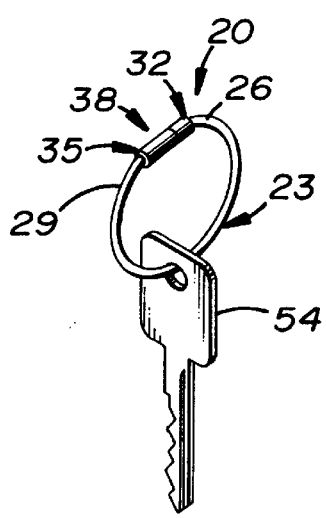
Figure 4:
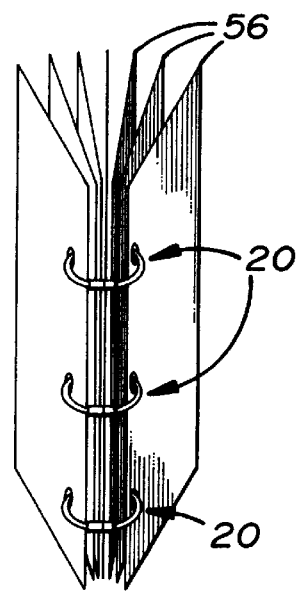

Loop assembly 20 can be used as a key chain wherein one or more keys 54 are retained thereon (FIG. 3). Multiple loop assemblies 20 can be used as a ring binder to hold a plurality of loose leaf pages 56 together (FIG. 4). Such connector 38 can likewise be used for connecting together the ends of jewelry chains such as on necklaces and bracelets (not shown) and practically anywhere a reclosable, flexible loop is required.

Figure 5:
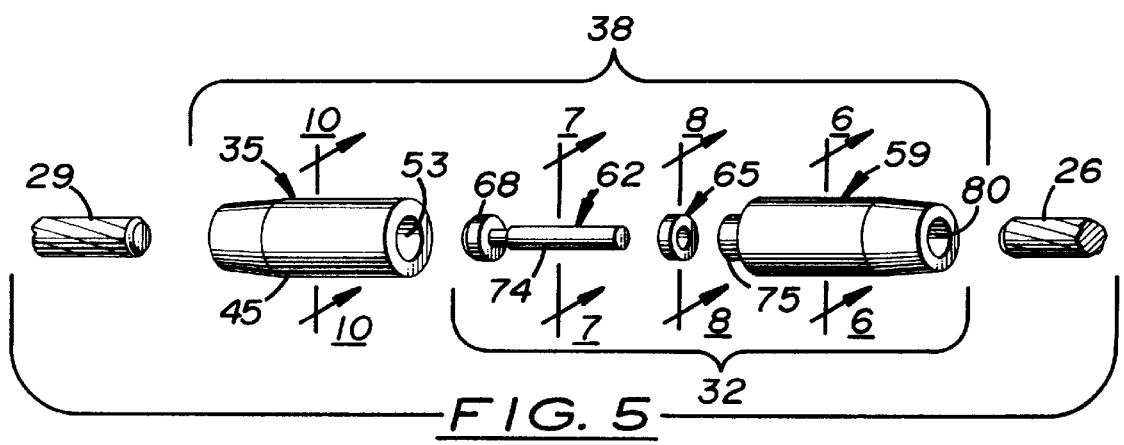
Figure 7:
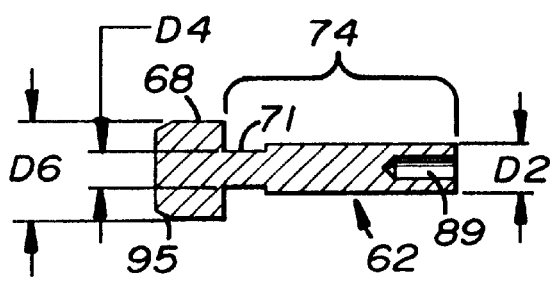
Figure 8:
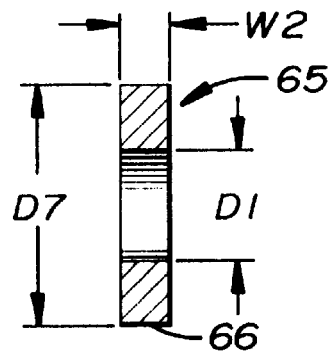
Figure 9:
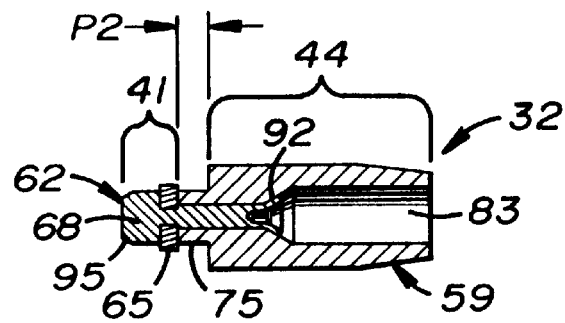

As best shown in FIGS. 5 and 9, male connector half 32 comprises an elongate, generally cylindrical male connector member 59, an insert pin 62, both typically made of metal, and a first version lock ring 65 having a generally rectangular or square cross-section including outer portion 66 thereof, which lock ring 65 is typically made of plastic such as nylon or polypropylene (FIG. 8). Front plug 41 comprises a head 68 of insert pin 62, reduced outer diameter undercut portion 71 of an elongate tail portion 74 of insert pin 62, a necked-down portion 75 of male connector member 59, and lock ring 65. Inner diameter D1 of lock ring 65 is of generally equal or greater diameter than outer diameter D2 of tail portion 74 so as to slide thereover onto undercut portion 71 (FIGS. 7 and 8). The outer diameter D4 of undercut portion 71 is less than inner diameter D1 of lock ring 65 so as to allow radially-inward compression of lock ring 65 when fit into socket bore 53 of female connector member 45. Tail portion 74 closely fits within a front portion 77 of a bore 80 which extends through male connector member 59. A rear portion 83 of bore 80 is typically of a larger diameter to accommodate end portion 26 of cable 23 to be affixed therein such as by crimping rear attachment portion 44 thereon or by soldering or adhesively affixing therein. A tapered shoulder 86 joins the front and rear portions 77 and 83 of bore 80. The length of tail portion 74 is such as to extend through front portion 77 of bore 80 and tapered shoulder 86 when lock ring 65 is assembled about recessed portion 71. An end bore 89 extends longitudinally into tail portion 74 of insert pin 62 which is flared outwardly after assembly using a conically-pointed tool inserted into rear portion 83 of bore 80 which forms a locking flare 92 against tapered shoulder 86 to hold the male connector half 32 together. Likewise, end bore 89 can be omitted and tail portion 74 affixed in front portion 77 of bore 80 by other means such as pressfitting, adhesives, soldering, threading, or cross-pinning therein.

Figure 6:
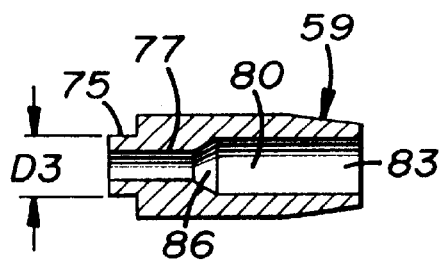
Figure 10:
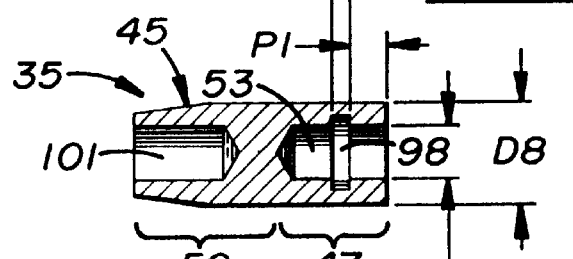
Figure 11:
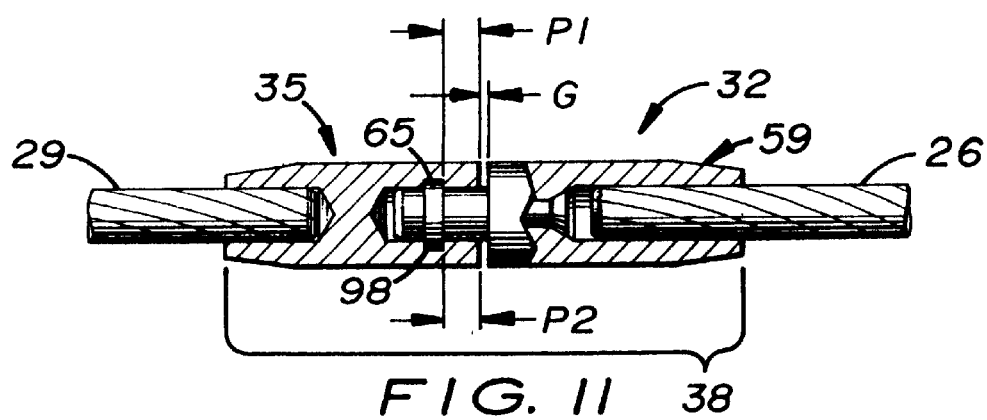

As best shown in FIGS. 5 and 10, first version female connector half 35 comprises first version female member 45 having front socket portion 47 which includes socket bore 53, and rear attachment portion 50. The inner diameter D5 of socket bore 53 is slightly less than outer diameter D6 of end piece 68 of insert pin 62 and than the outer diameter D3 of the necked-down portion 75 of male connector member 59, so as to closely fit within socket bore 53, with outer diameters D3 and D6 typically being equal (FIGS. 6 and 7). Head 68 of insert pin 62 can include an annular end taper 95 to facilitate entry into socket bore 53. The outer diameter D7 of lock ring 65 is slightly larger than diameters D5 of the socket bore, D6 of head 68, and D3 of the necked-down portion 75 (FIG. 8). Thus, plug 41 closely fits within socket bore 53 to minimize wobble between male and female connector halves 32 and 35, with lock ring 65 being slightly radially-inwardly compressed to fit therein during insertion. An annular lock groove 98 in socket bore 53, of generally squared-off cross-section and of a width W1 generally equal to or slightly greater than width W2 of outer portion 66 of lock ring 65 and of an inner diameter D8 which is larger than inner diameter D5 of female connector member 45, is of such a longitudinal position P1 on female connector member 45 relative to a longitudinal position P2 of the necked-down portion 75 on male connector member 59, allowing for a gap G, which allows lock ring 65 to radially-outwardly expand upon reaching lock groove 98 so as to removably retain male and female connector halves 32 and 35 connected together (FIGS. 8–11). When a threshold longitudinal separation force is reached, lock ring 65 is compressed back to diameter D5 of socket bore 53 and male and female connector halves 32 and 35 separate. A bore 101 longitudinally extends into rear attachment portion 50 of female connector member 45 and being of such a diameter as to accommodate end portion 29 of cable 23 and affixed therein such as by crimping rear attachment portion 50 thereon or by soldering or adhesively affixing therein, which bore 101 can connect with socket bore 53 if desired such as for manufacturing purposes. Rear attachment portion 50 of female connector member 45 and rear attachment portion 44 of first version male connector half 32 facilitate connection and disconnection of male and female connector halves 32 and 35 by providing areas for gripping in hand by a user during such connection and disconnection of connector 38.

Referring to FIG. 12, therein is shown connector 38 with rear attachment portion 44 of male connector half 32 crimped as at C1 around cable end portion 26, and rear attachment portion 50 of female connector member 45 crimped as at C2 around cable end portion 29 rather than soldering or adhesively fastening therein.

A second embodiment connector 38A is shown in FIG. 13, which uses a second version male connector half 32A which is the same as first version male connector half 32 except for the use of a second version lock ring 65A which is similar to lock ring 65 but wherein outer portion 66A thereof is of generally rounded cross-section (FIG. 14). This requires the use of a second version female connector half 35A comprising a second version female connector member 45A which has a lock groove 98A of generally rounded cross-section to match the generally rounded outer portion 66A of second version lock ring 65A (FIG. 15). Connector 38A functions in a similar manner as connector 38.

A third embodiment connector 38B is shown in FIG. 16, which uses a third version male connector half 32B which is the same as the first and second version male connector halves 32 and 32A, except for the use of a third version lock ring 65B, which is similar to lock rings 65 and 65A except that for being of completely generally rounded cross-section, including a rounded outer portion 66B (FIG. 17). As such, second version female connector half 35A, which utilizes second version female connector member 45A, can be used therewith since lock groove 65A thereof is of generally rounded cross-section to match that of third version lock ring 65B. Connector 38B functions in a similar manner as connectors 38 and 38A.

While the lock rings are typically made of plastic such as nylon or polypropylene so as to be tough and abrasion-resistant yet allow radially-inward compression thereof, other designs of such lock rings are contemplated within the inventive concept which radially-inwardly compress in a similar manner. For example, lock rings can be made which are slit so as to form a C-shape, being made of plastic such as nylon or polypropylene, or metal such as stainless steel, nickel or chrome plated mild steel, brass, or other such metal, the cross-section thereof being of generally rounded, squared-off rectangular or square, or other cross-section, with an annular lock groove of mating squared-off, rounded, or other such cross-section in the female connector member. Such alternate version, C-shaped lock ring 65C is shown in FIG. 18 which can be applied to all versions of the lock rings 65, 65A, 65B, and others which is made by adding a longitudinal split 104 during molding or by machining away enough material so as to allow the lock ring to radially-inwardly compress more easily. Such C-shaped lock rings are particularly useful when the material from which the lock ring is made is metal, which material can increase durability of the lock ring, but which metal lock ring might otherwise require excessive force to radially-inwardly compress resulting in excessive connection and disconnection forces of the connector.

Likewise, the flexible member of the loop assemblies can be made of virtually any flexible and/or bendable material such as solid plastic comprising nylon or polypropylene, which can be dyed or otherwise colored, or metal such as stainless steel, nickel plated mild steel, copper, or aluminum (typically with an anodized coating). In a multi-filament configuration, the flexible member can be made of such same plastics, or metal such as stainless steel, chrome or nickel plated mild steel, brass, copper, or aluminum (typically with an anodized coating), or even gold or silver such as for jewelry. In such multi-filament configuration, the filaments are typically twisted or braided together, which multi-filament metal flexible member can be covered by a plastic tube cover, such as made of vinyl or nylon, or plastic dip covered such as with vinyl or nylon. The flexible member can also comprise a chain, particularly for jewelry such as bracelets and necklaces, such chains being made of plastic or metal such as stated for solid or multi-filament plastic and metal flexible members above.

The male and female connector halves and component parts thereof can also be made of plastic, such as by an injection molding process, including but not limited to nylon and polypropylene, or made of metal such as stainless steel, chrome or nickel plated mild steel, brass, copper, aluminum (typically with an anodized coating), or even gold or silver such as for use in jewelry. Manufacturing processes such as adhesive fastening and thermal fusion are usable with plastic parts, such as to retain the insert pin, rather than flaring the end of such pin. The size of such connectors can be very small such as for fine jewelry, or up to one-half inch or larger in diameter and can include advertising, logos, or other matter printed thereon such as by silk screening or hot stamping processes. Likewise, the connectors can have configurations other than generally cylindrical or circular in cross-section, such as square, rectangular, oval, and polygonal. The outer surface thereof can be textured and/or have recessed finger-gripping areas, particularly the larger versions thereof, to aid in connecting and disconnecting thereof. The attachment means can comprise integral loops, studs, or other means at one end of the respective connector such as for use in jewelry such as bracelets and necklaces. The respective parts of male and female connector halves can be chamfered or tapered as needed to facilitate smooth operation of the connector. For example, the inner edge of the socket bore of the female member can be chamfered and/or tapered so as to aid in compressing the lock ring during insertion thereof such socket bore. Likewise, the outer edges of the rectangular cross-section lock ring can be chamfered to facilitate entry into the socket bore.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A connector for attachment to respective end portions of an elongate flexible member to removably connect such end portions together such as to form a closed loop, comprising:

a male connector half comprising a longitudinally extending front plug of generally circular cross-section, which plug includes an intermediate reduced outer diameter portion substantially coaxial therewith, a rear attachment portion which extends longitudinally from said plug, which rear attachment portion includes attachment means for affixing thereto one end portion of the flexible member, and a radially-inwardly compressible annular lock ring disposed about said reduced outer diameter portion having an inner diameter larger than the outer diameter of said reduced diameter portion so as to permit radially-inward compression of said lock ring, and having an outer diameter larger than that of the portions of said plug immediately longitudinally adjacent said lock ring;

a female connector half comprising a female connector member having a front socket portion with a socket bore of generally circular cross-section extending longitudinally thereinto, and a rear attachment portion extending longitudinally from said front socket portion, which rear attachment portion includes attachment means for affixing thereto the other end portion of the flexible member, said socket bore being of such inner diameter relative to the outer diameter of said plug and said lock ring to closely fit about said plug when inserted therein and to radially-inwardly compress said lock ring during such insertion, which bore includes an annular lock groove of such longitudinal position and cross-section to allow said lock ring to radially-outwardly expand thereinto so as to removably retain said lock ring with said male connector attached to said female connector; and wherein a free end of said plug comprises a separate head from a remainder of said plug which is affixed to said plug so as to facilitate assembly of said lock ring onto said reduced outer diameter portion of said plug, said remainder of said plug and said rear attachment portion comprising a male connector member.

2. A connector according to claim 1, wherein:

the remainder of the plug has a coaxial front bore extending longitudinally thereinto; and the head of the plug includes a coaxial rear portion of a smaller diameter than the remainder of said head which rear portion fits within said front bore and is affixed therein, said head and smaller diameter rear portion comprising an insert pin.

3. A connector according to claim 2, wherein the insert pin is affixed to the remainder of the plug by means of a press-fit wherein the outer diameter of the rear portion of the insert pin prior to assembly is slightly larger than the inner diameter of the front bore of the plug.

4. A connector according to claim 2, wherein:

the insert pin has an end bore of generally circular cross-section which extends longitudinally into the free end of the rear portion thereof and being generally coaxial therewith;

the attachment means includes a circular rear bore extending inwardly through the rear attachment portion of the male connector member, substantially coaxial with and connecting to the front bore thereof, and being of a larger inner diameter than the outer diameter of the rear portion of the insert pin so as to define a shoulder therebetween with said end of the rear portion of said insert pin flared radially outwardly at said shoulder so as to retain said insert pin and lock ring to said male member, said circular rear bore also being of such an inner diameter as to allow one of the end portions of the flexible member to extend into and be affixed therein; and the attachment means of the female connector half includes a circular rear bore extending inwardly into the rear attachment portion of the female connector member, generally coaxial with the front bore thereof, and being of such size as to allow the other of the end portions of the flexible member to extend into and be affixed therein.

5. A connector according to claim 4, wherein the shoulder of the male member between the front and rear bores thereof is annularly tapered.

6. A connector according to claim 2, wherein the reduced outer diameter portion is the portion of the rear portion of the insert pin immediately adjacent the head thereof.

7. A connector according to claim 6, wherein the reduced outer diameter portion of the rear portion of the insert pin longitudinally extends only approximately the width of the lock ring with the remainder of the rear portion being of a larger outer diameter than that of said reduced diameter portion.

8. A connector according to claim 1, wherein:

the lock ring is of generally rectangular cross-section; and the annular lock groove of the female member is of generally squared-off cross-section so as to mate with the generally rectangular cross-section of said lock ring.

9. A connector according to claim 1, wherein:

the lock ring is of generally square cross-section; and the annular lock groove of the female member is of generally squared-off cross-section so as to mate with the generally square cross-section of said lock ring.

10. A connector according to claim 1, wherein:

the radially outer portion of the lock ring is of generally rounded cross-section; and the annular lock groove of the female member is of generally rounded cross-section so as to fit the generally rounded cross-section of the radially outer portion of said lock ring.

11. A connector according to claim 1, wherein:

the lock ring is of generally completely rounded cross-section; and the annular lock groove of the female member is of generally rounded cross-section so as to fit the generally completely rounded cross-section of said lock ring.

12. A connector according to claim 1, wherein the lock ring has a longitudinal split which allows radially-inward compression thereof.

13. A connector according to claim 1, wherein the lock ring is made of plastic.

14. A connector according to claim 1, wherein the male and female members are each made of metal.

15. A connector according to claim 14, wherein the metal of which each of the male and female members are made primarily comprises a metal chosen from the set consisting of stainless steel, mild steel, brass, copper, aluminum, gold, or silver.

16. A closable loop assembly, comprising:

an elongate flexible member having opposite end portions;

a male connector half comprising a longitudinally extending front plug of generally circular cross-section, which plug includes an intermediate reduced outer diameter portion substantially coaxial therewith, a rear attachment portion which extends longitudinally from said plug, which rear attachment portion includes attachment means for affixing thereto one end portion of the flexible member, and a radially-inwardly compressible annular lock ring disposed about said reduced outer diameter portion having an inner diameter larger than the outer diameter of said reduced outer diameter portion so as to permit radially-inward compression of said lock ring, and having an outer diameter larger than that of the portions of said plug immediately longitudinally adjacent said lock ring;

a female connector half comprising a female connector member having a front socket portion with a socket bore of generally circular cross-section extending longitudinally thereinto, and a rear attachment portion extending longitudinally from said front socket portion, which rear attachment portion includes attachment means for affixing thereto the other end portion of the flexible member, said socket bore being of such inner diameter relative to the outer diameter of said plug and said lock ring to closely fit about said plug when inserted therein and to radially-inwardly compress said lock ring during such insertion, which bore includes an annular lock groove of such longitudinal position and cross-section to allow said lock ring to radially-outwardly expand therein so as to removably retain said lock ring with said male connector attached to said female connector; and wherein a free end of said plug comprises a separate head from a remainder of said plug which is affixed to said plug so as to facilitate assembly of said lock ring onto said reduced outer diameter portion of said plug, said remainder of said plug and rear attachment portion comprising a male connector member.

17. A loop assembly according to claim 16, wherein:

the remainder of the plug has a coaxial front bore extending longitudinally thereinto; and the head of the plug includes a coaxial rear portion of a smaller diameter than the remainder of said head which rear portion fits within said front bore and is affixed therein, said head and smaller diameter rear portion comprising an insert pin.

18. A loop assembly according to claim 17, wherein the insert pin is affixed to the remainder of the plug by means of a press-fit wherein the outer diameter of the rear portion of the insert pin prior to assembly is slightly larger than the inner diameter of the front bore of the plug.

19. A loop assembly according to claim 17, wherein:

the insert pin has an end bore of generally circular cross-section which extends longitudinally into the free end of the rear portion thereof and being generally coaxial therewith;

the attachment means includes a circular rear bore extending inwardly through the rear attachment portion of the male connector member, substantially coaxial with and connecting to the front bore thereof, and being of a larger inner diameter than the outer diameter of the rear portion of the insert pin so as to define a shoulder therebetween with said end of the rear portion of said insert pin is flared radially outwardly at said shoulder so as to retain said insert pin and lock ring to said male member, said circular rear bore also being of such an inner diameter as to allow one of the end portions of the flexible member to extend into and be affixed therein; and the attachment means of the female connector half includes a circular rear bore extending inwardly into the rear attachment portion of the female connector member, generally coaxial with the front bore thereof, and being of such size as to allow the other of the end portions of the flexible member to extend into and be affixed therein.

20. A loop assembly according to claim 19, wherein the male and female members and the flexible member are each made of metal.

21. A loop assembly according to claim 20, wherein the ends of the flexible member are affixed within the respective rear bores of the male and female members by means of soldering.

22. A loop assembly according to claim 20, wherein the ends of the flexible member are affixed within the respective rear bores of the male and female members by means of crimping.

23. A loop assembly according to claim 19, wherein the shoulder of the male member between the front and the rear bores is annularly tapered.

24. A loop assembly according to claim 19, wherein:

the male and female members are made of metal;

the flexible member comprises monofilament plastic; and the ends of the flexible member are affixed within the respective rear bores of the male and female members by means of crimping.

25. A loop assembly according to claim 24, wherein the plastic comprises nylon.

26. A loop assembly according to claim 18, wherein:

the lock ring is of generally rectangular cross-section; and the annular lock groove of the female member is of generally squared-off cross-section so as to mate with the generally rectangular cross-section of said lock ring.

27. A loop assembly according to claim 18, wherein the lock ring has a longitudinal split which allows radially-inward compression thereof.

28. A loop assembly according to claim 18, wherein the lock ring is made of plastic.

29. A loop assembly according to claim 18, wherein the male and female members and the flexible member are each made of metal.

30. A loop assembly according to claim 29, wherein the metal of which each of the male and female members and the flexible member are made primarily comprises a metal chosen from the set consisting of stainless steel, mild steel, brass, copper, aluminum, gold, or silver.

31. A loop assembly according to claim 29, wherein the flexible member comprises a plurality of elongate filaments.

* * * * *